United States Patent [19]

Szycher et al.

[11] Patent Number: 4,483,759

[45] Date of Patent: Nov. 20, 1984

[54] ACTINIC RADIATION CURED POLYURETHANE ACRYLIC COPOLYMER

[75] Inventors: Michael Szycher, Lynnfield; Donald J. Dempsey, Billerica; Jonathan L. Rolfe, North Easton, all of Mass.

[73] Assignee: Thermedics, Inc., Woburn, Mass.

[21] Appl. No.: 394,537

[22] Filed: Jul. 2, 1982

[51] Int. Cl.³ .................. C08F 2/50; C08G 18/67
[52] U.S. Cl. .................. 204/159.24; 204/159.23; 204/159.11; 528/75; 528/76
[58] Field of Search ............ 204/159.19, 159.24; 528/75

[56] References Cited

U.S. PATENT DOCUMENTS

| | | | |
|---|---|---|---|
| 3,625,744 | 12/1971 | Juna et al. | 117/93.31 |
| 3,653,959 | 4/1972 | Kehr et al. | 117/201 |
| 3,700,643 | 10/1972 | Smith et al. | 260/77.5 |
| 3,715,293 | 2/1973 | Sandner et al. | 204/159.14 |
| 3,723,370 | 3/1973 | Watanabe et al. | 260/22 TN |
| 3,753,720 | 8/1973 | Kloczewski et al. | 96/115 R |
| 3,759,807 | 9/1973 | Osborn et al. | 204/159.23 |
| 3,836,492 | 9/1974 | Watanabe et al. | 260/23 TN |
| 3,840,390 | 10/1974 | Kozu et al. | 117/93.31 |
| 3,840,448 | 10/1974 | Osborn et al. | 204/159.14 |
| 3,847,768 | 11/1974 | Maruyama | 204/159.14 |
| 3,850,770 | 11/1974 | Juna et al. | 204/159.19 |
| 3,864,133 | 2/1975 | Hisamatsu et al. | 95/115 P |
| 3,876,519 | 4/1975 | McGinniss | 204/159.24 |
| 3,876,726 | 4/1975 | Ford, Jr. et al. | 260/859 R |
| 3,877,971 | 4/1975 | Guthrie et al. | 427/53 |
| 3,881,473 | 5/1975 | Corvi et al. | 128/90 |
| 3,888,830 | 6/1975 | Ogasawara et al. | 260/76 |
| 3,899,611 | 8/1975 | Hall | 427/54 |
| 3,915,824 | 10/1975 | McGinniss | 204/159.23 |
| 3,919,438 | 11/1975 | Urekevich | 427/54 |
| 3,929,929 | 12/1975 | Kuehn | 260/859 R |
| 3,930,971 | 1/1976 | Karoly et al. | 204/159.11 |
| 3,935,364 | 1/1976 | Proksch et al. | 428/304 |
| 3,943,046 | 3/1976 | De Sorga et al. | 204/159.23 |
| 3,953,877 | 4/1976 | Sigusch et al. | 357/72 |
| 3,965,277 | 6/1976 | Guditz et al. | 427/43 |
| 4,038,257 | 7/1977 | Suzuki et al. | 260/75 NK |
| 4,039,414 | 8/1977 | McGinniss | 204/181 |
| 4,040,925 | 8/1977 | McGinniss | 204/181 |
| 4,052,280 | 10/1977 | McGinniss | 204/159.14 |
| 4,073,835 | 2/1978 | Otsuki et al. | 264/22 |
| 4,131,604 | 12/1978 | Szycher | 528/79 |
| 4,285,073 | 8/1981 | Szycher | 3/13 |
| 4,312,972 | 1/1982 | Khanna | 528/75 |
| 4,367,302 | 1/1983 | Le Roy et al. | 528/75 |
| 4,374,238 | 2/1983 | Shanoski | 528/75 |

OTHER PUBLICATIONS

C. B. Rybny et al., "Ultraviolet Radiation Cured Coatings", Sep. 1974, vol. 46, No. 596.

Primary Examiner—Wilbert J. Briggs, Sr.
Assistant Examiner—A. H. Koeckert
Attorney, Agent, or Firm—Kenway & Jenney

[57] ABSTRACT

The actinic radiation cured composition of this invention comprises a polyurethane acrylic copolymer containing a light scattering or fluorescing material. The polyurethane acrylic copolymer is fully cured and is flexible and elastomeric.

4 Claims, No Drawings

ACTINIC RADIATION CURED POLYURETHANE ACRYLIC COPOLYMER

BACKGROUND OF THE INVENTION

The invention relates to a polyurethane-acrylic composition and a method for making such a composition. More particularly, the invention relates to a flexible and elastic actinic radiation cured polyurethane acrylic copolymer containing a light scattering or fluorescing material.

Polyurethane-acrylic protective and decorative coating compositions are well known. Conventionally, ovens and infrared sources have been used to cure such compositions. Most recently, ultraviolet (U.V.) energy curing has been suggested, using various U.V. sensitizers for sensitizing photopolymerization in ultraviolet wavelengths in the near-visible region. The literature on such photopolymerization and sensitization is abundant.

Advantages of U.V. curing over other conventional curing in ovens or the like include significantly faster curing times, savings in energy requirements, elimination of air pollution, and ready availability of equipment.

One problem with prior art U.V. cured polyurethane acrylic compositions is that they are all hard and rigid or semi-rigid, thus making them less suitable for certain applications. For example, the rigidity of the prior art polyurethane-acrylic compositions precluded the production of relatively thick functional polyurethane-acrylic structures. Another more significant problem with these compositions exists in the photocuring process itself. Due to light obscuration by opaque components, there is generally difficulty in obtaining full and uniform cure of the composition.

Accordingly, it is an object of the present invention to provide a substantially improved actinic radiation process for the curing of polymers wherein the polymers are fully cured.

Another object of the invention is to provide polyurethane acrylic copolymers that are flexible, elastomeric and solvent-resistant.

A further object of the invention is to provide such polyurethane acrylic copolymers in an efficient, reliable and inexpensive manner.

SUMMARY OF THE INVENTION

The problems of the prior art are overcome by the instant invention which comprises an actinic radiation cured polyurethane acrylic copolymer and a method for making such a copolymer. The copolymer comprises diisocyanate, high molecular weight glycol, low molecular weight acrylyl (chain terminator), and a light scattering or fluorescing material. Incorporation of a light scattering or fluorescing material into the photocurable polymeric mixture results in a broadened spectral distribution and a fully cured copolymer. The copolymer is flexible and elastomeric due to the judicious blend of the polyurethane and the acrylic chain terminator.

This fully cured, flexible and elastomeric copolymer provides a superior coating for printed circuit boards and is excellent for those applications requiring good adhesion to metallic substrates (e.g. patching of holes in aircraft, ships, etc.). Other uses of this copolymer may include use in the solar area for fabrication of low-cost fresnel lenses, use in the biomedical area as an adhesive for corneal implants or skin grafting and use in the paper industry as a flexible coating applied to paper.

DESCRIPTION OF THE PREFERRED EMBODIMENT

At the outset, the invention is described in its broadest overall aspects with a more detailed description following. The actinic radiation curable composition of the present invention comprises diisocyanate, high molecular weight glycol, low molecular weight acrylyl (chain terminator) and a light scattering or fluorescing material.

In addition to the foregoing required constituents, the composition preferably includes a catalyst and a photosensitizer and optionally an antioxidant and a surfactant.

In general, polyurethane polymers are the condensation product of reactions between diisocyanates (isocyanate compounds having a functionality of two), and compounds containing active hydrogen sites such as hydroxyl groups. Polymerization takes place in the presence of a difunctional hydroxyl compound (this can be either a simple glycol or a macromolecular glycol) according to the following reaction.

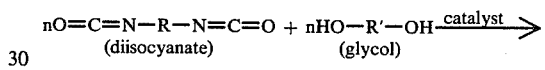

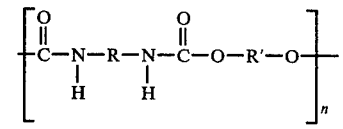

Although aromatic diisocyanates, such as toluene diisocyanate (TDI),

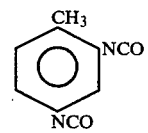

can be used in this invention, aliphatic diisocyanates are preferred because they yield a light stable material. Examples of aliphatic diisocyanates used in this invention are: hexamethylene diisocyanate (HDI), OCN (CH$_2$)$_6$ NCO; isophorone diisocyanate (IPDI)

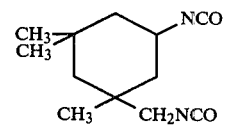

tri methyl hexamethylene diisocyanate (TMHDI)

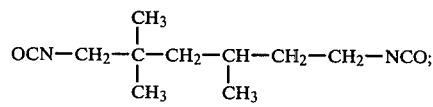

and dicylohexyl methane diisocyanate (HMDI),

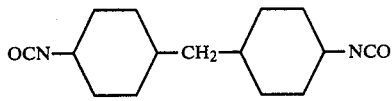

The preferred diisocyanate for forming polymers in accordance with this invention is isophorone diisocyanate (IPDI).

The difunctional dihydroxyl compound should have an average molecular weight between about 500 and 5,000, preferably between 1,000 and 3,000. In the preferred embodiment of this invention, polypropylene glycol (PPG)

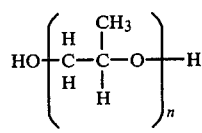

is utilized, where n is an integer selected to provide the desired molecular weight.

The polyurethane of the present invention also includes a low molecular weight acrylyl which terminates the polyurethane at each end. The acrylyl should have an average molecular weight between about 40 and 200 Daltons, and preferably between about 80 and 120 Daltons.

Illustrative of suitable acrylyl compounds, many more of which are well known in the art, methyl acrylate, ethyl acrylate, methoxyethyl acrylate, methyl methacrylate, hydroxyethyl acrylate, hydroxyethyl methacrylate.

In accordance with the present invention, the preferred acrylyl chain terminator is hydroxyethyl methacrylate (HEMA) which has the following formula:

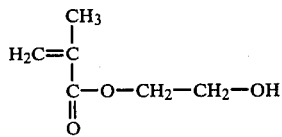

The preferred polyurethane of the invention has the following structural formula:

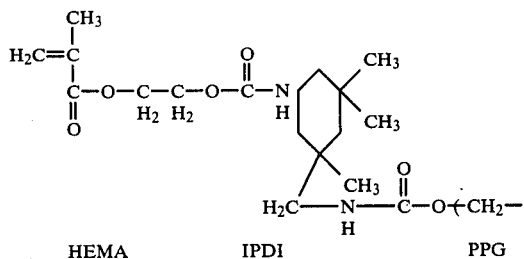

Where n is selected to give a molecular weight between 500–5000,

The molecule has a number average molecular weight of 1400 units, and a weight average molecular weight of 1200 molecular weight units.

In the preferred embodiment of this invention, the polyurethane acrylic copolymer has one acrylyl terminator at each end of the polyurethane, which polyurethane is composed of three units-two diisocyanate units and one macroglycol unit.

The reactants are provided in approximately the molar amounts necessary to produce the foregoing polymer.

Incorporated into the above polymeric mixture is a light scattering material, a fluorescing material, or a material that both fluoresces and light scatters. This incorporated material functions as an optical activator. The broadened spectral distribution caused by this optical activator results in a fully photocured polymer with no shadows.

Examples of light scatterers useful in the invention are silicon oxide and ¼ micron aluminum oxide. Examples of fluorescers useful in the invention are fluorescent dyes that fluoresce between 280-360 nanometers.

Phthalocyanine blue (p-blue), a crystalline material which both fluoresces and light scatters is the preferred optical activator.

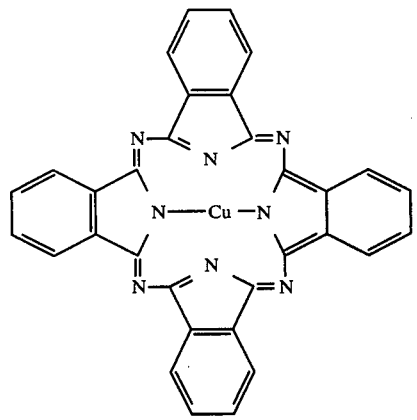

It is customary to incorporate into the polymer mixture a suitable catalyst to promote the polymerization reaction. Suitable catalysts include N-methyl morpholine, trimethylamine, triethyl amine, zinc octoate, dibutyl tin dilaurate and dioctyl tin dilaurate. Dioctyl tin dilaurate is the preferred catalyst.

A photosensitizer may be added to the polymer mixture to accelerate curing of the polymer mixture by actinic light. This is particularly desirable if the polymer is to be used in a high speed process in which rapid curing is required.

Photosensitizers useful herein include benzophenone, acetophenone, azobenzene, acenaphthene-quinone, o-methoxy benzophenone, Thioxanthen-9-one, xanthen-9-one, 7-H-Benz(de)anthracen-7-one, 1-naphthaldehyde, 4,4'-bis(dimethylamino)benzophenone, fluorene-9-one, 1'-acetonaphthone, 2'-acetonaphthone, anthraquinone, 2-tert.-butyl anthraquinone, 4-morpholinobenzophenone, p-diacetylbenzene, 4-aminobenzophenone, 4'-methoxyacetophenone, diethoxyacetophenone, benzaldehyde, and the like.

Specifically useful herein are acetophenone photosensitizers of the structure:

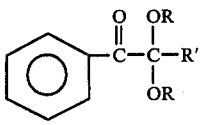

wherein R is alkyl of from 1 to about 8 carbon atoms, or aryl of 6 ring carbon atoms and R' is hydrogen, alkyl of from 2 to about 8 carbon atoms, aryl of from 6 to 14 carbon atoms, or cyclo alkyl of 5 to 8 ring carbon atoms.

Diethoxyacetophenone is the preferred photosensitizer.

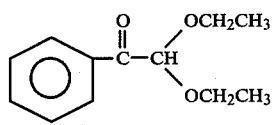

The polyurethane may be prepared from three components which can be referred to as Part A, Part B, and Part C. Part A is the diisocyanate. Part B is comprised of: a macroglycol, the low molecular weight acrylyl terminator, the optical activator, the photosensitizer, the catalyst, and the surfactant. Part C is comprised of the antioxidant (to inhibit spontaneous oxygen-initiated curing). The polyurethane can also be prepared from two components wherein Part A would remain the diisocyanate and Part B would comprise all the other constituents including the antioxidant. Of course, the optical activator, photosensitizer, catalyst, antioxidant and lubricant do not combine chemically as part of the polymer.

When preparing a polyurethane element from the three components Part A, Part B and Part C, first the proper stoichiometric proportions of Part A and Part B are added together. The proper stoichiometric proportions of Part C are added to Part A and Part B and the three are then emulsified by a mixer at room temperature to form a moderately reactive thixotropic mixture having a viscosity below about 2,500 cps.

Since the emulsification of A and B introduces air into the reaction mixture, the air must be removed. The air bubbles are removed by placing the vessel containing the emulsion under a bell jar and evacuating the air from the bell jar with a suction device. The bell jar is evacuated to a pressure of about 0.3 microns and the mixture is kept under the bell jar about 8 minutes causing the mixture to appear to boil. After the emulsion is taken from the bell jar it is allowed to stand until the exothermic reaction that is taking place brings it to a temperature of about 40° C.

The mixture of A, B and C is then applied to a substrate and photocured on the substrate by exposure to actinic light. For example, the composition can be applied to a printed circuit board either by spraying the composition onto the circuit board or by dipping the circuit board into the composition. Actinic light useful herein for curing is ultraviolet light and other forms of actinic radiation which are normally found in radiation emitted from the sun or from artificial sources such as type RS sunlamps, carbon arc lamps, xenon arc lamps, mercury vapor lamps, tungsten halide lamps and the like. Ultraviolet radiation having a wavelength from about 200 to about 360 nanometers is suitable. The curing period is very short, usually between 0.5 and 15 seconds, when the composition is exposed to actinic light having a power density of 10 kw/ft$^2$.

The invention is further illustrated by the following non-limiting examples.

EXAMPLE 1

16.8% by weight of toluene diisocyanate (TDI) is reacted with a blend of the following: 64.3% by weight of 2,000 molecular weight polypropylene glycol, 16.7% by weight of hydroxyethyl methacrylate (HEMA), 1.9% by weight of diethoxyacetophenone (DEAP), 0.1% by weight of dioctyl tin dilaurate, 0.1% by weight of silicon oxide sold under the trade name of CabOSil obtained from the Cabot Company and 0.1% by weight of a surfactant sold under the trade name of ModaFlow obtained from Monsanto Chemical Corporation. Irganox 1010 in the amount of 1% by weight of the above mixture is then added to the reaction mixture. Irganox 1010 is an antioxidant sold by Ceiba Geigy. The chemical name of the anti-oxidant is tetrakis [methylene(3,5-di-tertbutyl-4-hydroxyhydrocinnamate)]methane.

The above constituents are emulsified by mixing for 10 minutes and then deaerated until all entrained gases are removed. The mixture is then exposed for 10 seconds to ultraviolet radiation emitted from a mercury lamp having a wavelength of approximately 254 nanometers and a power density of 10 kw/ft$^2$. This results in a fully cured, solvent-resistant, transparent elastic compound with the following physical properties: tensile strength 550 psi, elongation 50%, hardness, (Shore A) 45.

EXAMPLE 2

21.1% by weight of TDI is reacted with a blend of the following: 60.8% by weight of 1,000 molecular weight polypropylene glycol, 15.8% by weight of HEMA, 2.0% by weight of DEAP, 0.1% by weight of dioctyl tin dilaurate, 0.1% by weight of ¼ micron aluminum oxide, and 0.1% by weight of ModaFlow. Irganox 1010 in the amount of 1% by weight of the above mixture is then added to the reaction mixture.

Emulsifying, deaerating, and U.V. curing procedures of Example 1 are followed. This results in a fully cured, solvent-resistant, transparent elastic compound with the following physical properties: tensile strength 620 psi, elongation 50%, hardness, (Shore A) 45.

EXAMPLE 3

20.4% by weight of isophorone diisocyanate (IPDI) was reacted with a blend of the following: 61.3% by weight of 2,000 molecular weight polypropylene glycol, 16.0% by weight of HEMA, 2% by weight of DEAP, 0.1% by weight of dioctyl tin dilaurate, 0.1% by weight of phthalocyanine blue (p-blue) and 0.1% by weight of ModaFlow. Irganox 1010 in the amount of 0.1% by weight of the above mixture is then added to the reaction mixture.

Emulsifying, deaerating, and U.V. curing procedures of Example 1 were followed. This results in a fully cured, solvent-resistant, transparent elastic compound with the following physical properties: tensile strength 820 psi, elongation 75%, hardness, (Shore A) 50.

EXAMPLE 4

25.5% by weight of IPDI was reacted with a blend of the following: 57.3% by weight of 1,000 molecular weight polypropylene glycol, 14.9% by weight of HEMA, 2% by weight of DEAP, 0.1% by weight of dioctyl tin dilaurate, 0.1% by weight of p-blue, and 0.1% by weight of ModaFlow. Irganox 1010 in the amount of 0.1% by weight of the above mixture was then added to the reaction mixture.

Emulsifying, deaerating, and U.V. curing procedures of Example 1 were followed. This results in a fully cured, solvent-resistant, transparent elastic compound with the following physical properties: tensile strength 900 psi, elongation 150%, hardness, (Shore A) 55.

EXAMPLE 5

25.4% by weight of IPDI was reacted with a blend of the following: 57.2% by weight of 1,000 molecular weight polypropylene glycol, 13.3% by weight of hydroxyethyl acrylate, 3.8% by weight of DEAP, 0.1% by weight of dioctyl tin dilaurate, 0.1% by weight of p-blue, 0.1% by weight of ModaFlow. Irganox 1010 in the amount of 0.1% by weight of the above mixture was then added to the reaction mixture.

Emulsifying, deaerating, and U.V. curing procedures of Example 1 were followed. This results in a fully cured, solvent-resistant, transparent elastic compound with the following physical properties: tensile strength 1500 psi, elongation 300%, hardness, (Shore A) 55.

We claim:

1. A process for forming a polyurethane acrylic composition comprising:
    (A) providing reactants comprising:
        (1) a diisocyanate;
        (2) a glycol having a molecular weight between the range of 500–5,000 molecular weight units;
        (3) an acrylyl chain terminator having a molecular weight between the range of 40–200 molecular weight units;
        (4) a catalyst capable of catalyzing urethane bond formation; and
        (5) a photosensitizer; and
    wherein there are 2 diisocyanate units for each glycol unit; and
    there is only one acrylyl group terminator at each end of the polyurethane chain;
    (B) mixing the reactants to form a reactive mixture;
    (C) degassing the reactive mixture to remove entrained air; and
    (D) actinic radiation curing the reactive mixture to form a polyurethane composition.

2. The process of claim 1 wherein in step (D) actinic radiation comprises ultraviolet radiation.

3. Th process of claim 1 wherein in step (A) the diisocyanate is aliphatic.

4. The process of claim 1 wherein the catalyst is dioctyl tin dilaurate.

* * * * *